Figure 1:
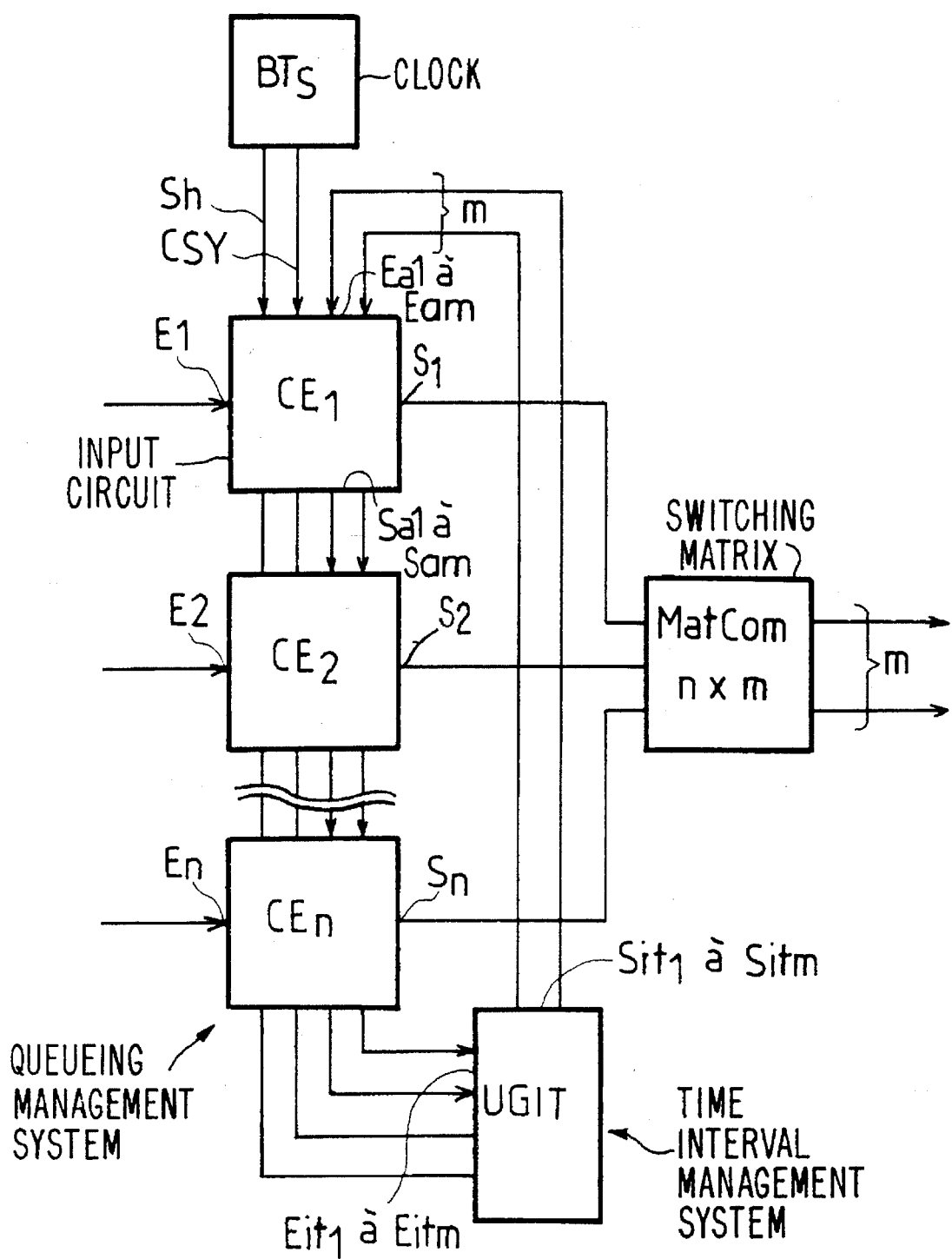

United States Patent [19]

Boyer et al.

[11] Patent Number: 5,517,496

[45] Date of Patent: May 14, 1996

[54] INPUT WAITING LINE SYSTEM ESPECIALLY PROVIDED FOR CONNECTION TO THE INPUTS OF A BLOCKAGE-FREE SWITCHING MATRIX OF THE SPATIAL TYPE

[75] Inventors: Pierre Boyer; Jean-Pierre Coudreuse; Michel Servel, all of Lannion, France

[73] Assignee: France Telecom, France

[21] Appl. No.: 316,527

[22] Filed: Sep. 30, 1994

[30] Foreign Application Priority Data

Oct. 20, 1993 [FR] France ................... 93 12720

[51] Int. Cl.[6] ..................... H04L 12/54; H04Q 11/04
[52] U.S. Cl. ..................... 370/60.1; 370/61; 370/65.5; 370/68.1; 370/94.2; 340/825.79
[58] Field of Search ................ 370/53, 58.1, 58.2, 370/58.3, 59, 60, 60.1, 65, 65.5, 66, 68, 68.1, 85.7, 94.1, 94.2, 95.1, 61; 379/268, 269, 271, 272, 273, 291, 335; 340/825.03, 826, 827, 825.79, 825.8

[56] References Cited

U.S. PATENT DOCUMENTS

| | | | |
|---|---|---|---|
| 4,884,264 | 11/1989 | Servel et al. | 370/58.1 |
| 4,980,885 | 12/1990 | Servel et al. | 370/60 |
| 5,168,492 | 12/1992 | Beshai et al. | 370/60.1 |
| 5,179,552 | 1/1993 | Chao | 370/60 |
| 5,287,346 | 2/1994 | Bianchini, Jr. et al. | 370/60 |

*Primary Examiner*—Alpus Hsu
*Attorney, Agent, or Firm*—Laff, Whitesel, Conte & Saret, Ltd.

[57] ABSTRACT

A queueing circuit serves an asynchronous switching circuit. A number of input circuits are connected to inputs of a switching network in a one-to-one relationship with the outputs of the switching matrix. During its own time slot, each of the input circuit has a series of availability signals which are assigned to time slots that are later than the input circuit's own time slot. These availability signals indicate the availability condition at the matrix output for enabling an emission of a data cell during the time slot identified by the availability signal. Based upon the availability signal, the cell is released from a memory storage during an available one of the later time slots.

10 Claims, 5 Drawing Sheets

INPUT WAITING LINE SYSTEM ESPECIALLY PROVIDED FOR CONNECTION TO THE INPUTS OF A BLOCKAGE-FREE SWITCHING MATRIX OF THE SPATIAL TYPE

The present invention concerns an input queueing system intended primarily for connection to the inputs of a space-division switching matrix.

Asynchronous time-division switching networks are divided into several classifications, among which two main categories stand out. The first is based on the use of non-blocking space-division switching matrices monitored by queues linked to outputs. "COPRIN" type switches are typical of this category. By contrast, the second category uses input queues monitored by non-blocking space-division switches, for example switching matrices of the "BATCHER BANYAN" type.

Networks in the first category have the undeniable advantage of minimizing idle time and dither, while being able to accept, on account of their design, a relatively high internal load.

However, the entire content of the cells must be transferred to what may be termed a supermultiplex, thus restricting the capacity for uninhibited switching when relatively high throughputs are used. For example, throughputs in the order of 20 Gbit/s may be envisaged when the most up-to-date technology is used. It should be noted that in many applications, this type of technology is satisfactory.

In excess of these throughputs, however, staging of the matrices is necessary, leading generally to a multiplication of the queues through which the cells must pass. Blocking when communication is established also occurs, but in view of the large multiplex throughput and the large number of multiplexed virtual circuits, this parameter does not pose too many problems.

The drawback of the second category of networks to date is that they do not allow for the possibility of cell distribution during switching, unless a large number of circuits are added for saving and copying the cells. Moreover, intrincisally, their admissible load is restricted to 0.59. They also produce a longer delay and traversal delay dispersion than the first category and require, depending on the design specifications, a greater number of interconnections in view of the greater number of stages.

Solutions of varying degrees of success have been proposed to overcome these limitations, but in many cases these proposals are extremely expensive. One of the more recent proposals is based on the use of a content addressable memory (CAM). This is more attractive than the others, in that it proposes to convert the input queue associated with a "BATCHER BANYAN" matrix into a queue in which the first input cell exits at a moment dependent on the resolution of conflicts caused by the various requests for access to the same output originating from other inputs. During a time slot, requests for access to outputs are directed to a request processing circuit which, during the above-mentioned time slot and for each input queue, provides the first available time slot interval at the requested output, taking into account all other requests.

This proposal is described in the article entitled "A Scheduling Content-Addressable Memory for ATM Space Division Switch Control", published in IEEE International Solid-State Circuits Conference, 1991, page 244, under the authorship of Masao Akata et al, NEC Corporation, Japan.

To put into perspective the performance of this device, its design—despite an improvement of the CAM memory—results in an analysis time triple that required for access to a dual-access static memory produced with the same technology. The drawback of this method is that it requires a specific circuit operating in a relatively complex manner which, as a consequence, restricts the overall switched throughput.

The present invention proposes an input queueing system of the second category, capable of performing close to the output order of the first network category, but able to operate at higher speeds than these networks. An attempt has thus been made to multiply fourfold the overall switched throughput using equivalent technology.

For this purpose, the inputs of a switching matrix are connected to an input queueing system designed in accordance with the invention, comprising a succession of input circuits in which the inputs receive cells of the type used in a data transmission and/or ATM system, and the outputs are connected respectively to the corresponding inputs of the switching matrix, each input circuit containing a further series of inputs in a one-to-one relation with the switch matrix outputs, each designed to carry, during each time slot, a series of availability signals to which are assigned time slots later than the current time slot, whereby each availability signal indicates an available condition at the matrix output corresponding to the input carrying it, for the emission of a cell at the time slot assigned to the signal, and each input circuit is capable of storing, in a memory pocket, one cell present at its input at an address in relation to a time slot assigned to an availability signal indicating an available condition for emission of the cell to the matrix output to which is it addressed, the availability signal then indicating, after the storing operation, a non-available status, and the memory being read at an address corresponding to the current time slot, such that the cell stored at that address is sent to the switching matrix.

Furthermore, in accordance with the invention, in each input circuit the availability signals carried by an input during a time slot are respectively present at this input during the micro-intervals that subdivide each time slot, and are respectively assigned time slots later than the current time slot.

Furthermore, in accordance with the invention, these micro-intervals are determined by signals emitted by a time base, whereby the storage address of the cell present at the input of the input circuit is determined from the value taken by the micro-interval time signals when the availability signal at the input corresponding to the switch matrix output to which the current cell is addressed indicates an available condition.

Furthermore, in accordance with the invention, each input circuit contains a memory for storing the cell present at its input, the memory being read addressed by a local time signal sent by the time base, then write addressed by the micro-interval time signals sent by the time base.

Furthermore, the invention comprises the means for preventing a cell that has already been stored from being stored again.

Furthermore, in accordance with the invention, each input circuit is provided with m outputs corresponding to m inputs, to which are sent updated availability signals, the m outputs of an input circuit being connected to m inputs of the next input circuit in the succession of input circuits.

Furthermore, the updated availability signals sent to the m outputs of an input circuit are transmitted to m inputs of the next input circuit in succession with a delay equal in duration to that of one micro-interval, the time base of an input circuit being offset by one micro-interval from one input circuit to the next.

Furthermore, in accordance with the invention, each input circuit contains an assignment circuit intended to scrutinize the availability signals present at the m inputs of the input circuit and send updated availability signals to the m outputs of the input circuit, plus a control signal which, when active, controls the storage of the cell present at the input of the input circuit.

Furthermore, in accordance with the invention, the assignment circuit contains inputs which receive outgoing direction signals indicating the switch matrix output to which the cell currently present at the input of the input circuit is addressed.

Furthermore, in accordance with the invention, the assignment circuit comprises a number of AND gates with at least two inputs, the first receiving outgoing direction signals and the second receiving availability signals. The gate outputs are connected respectively to the inputs of an OR gate, the output of which constitutes the output of the assignment circuit. The output of each gate of row j is also connected to one input of an OR gate, the second input of which receives an availability signal, while the OR gate outputs are connected respectively to the outputs of the assignment circuit sending the updated availability signals.

Figure 2:
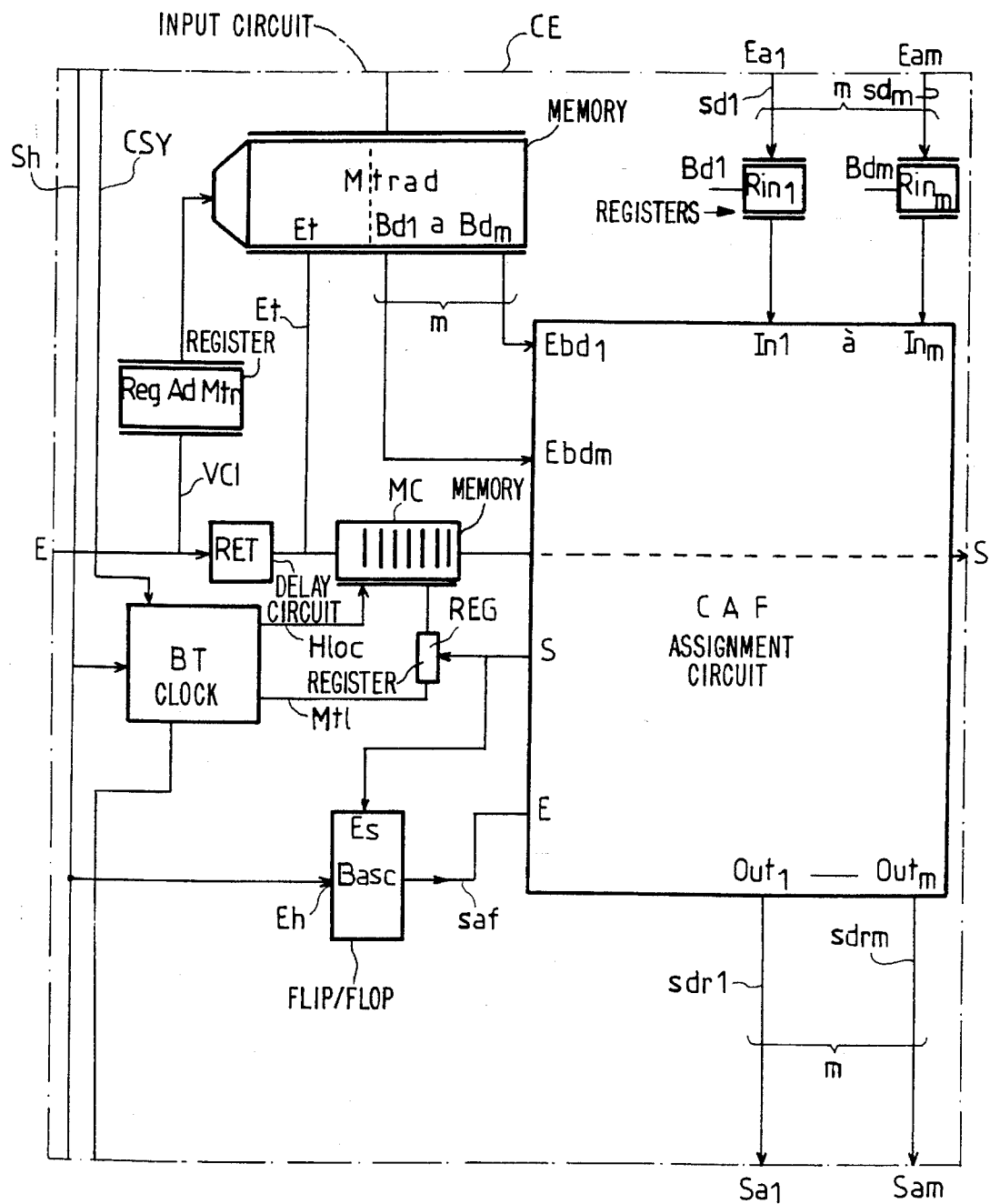
Figure 3:
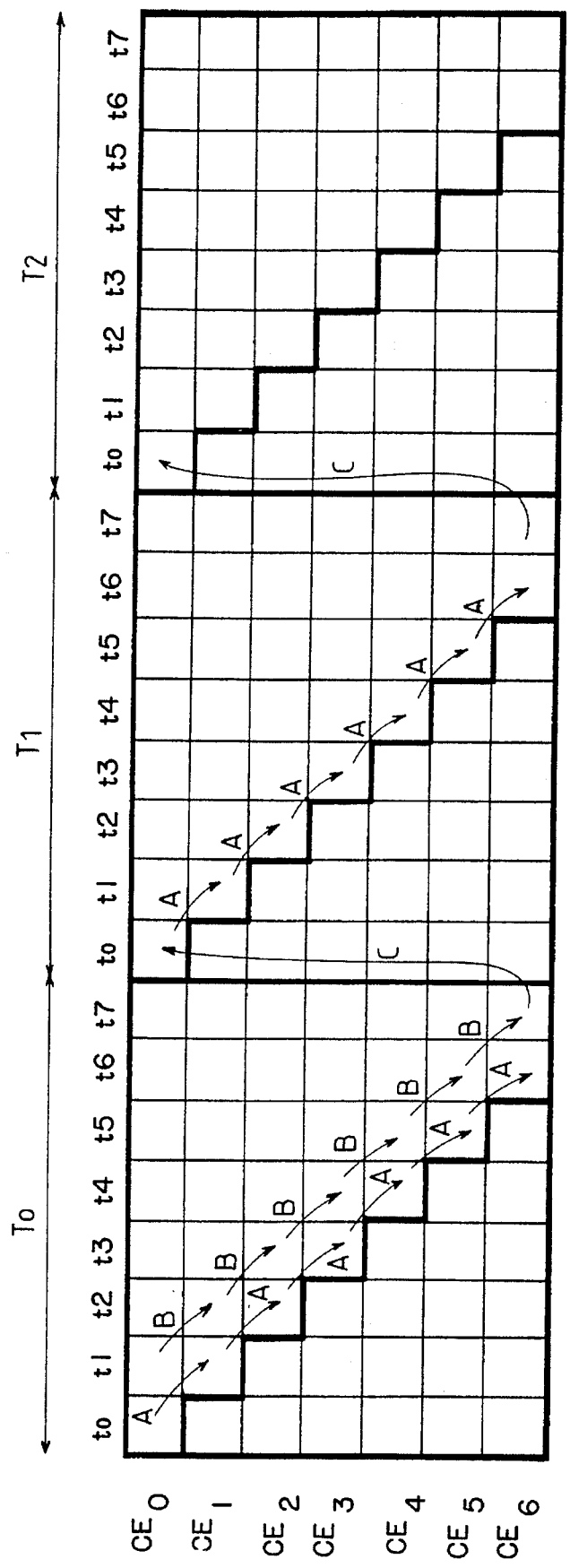
Figure 4:
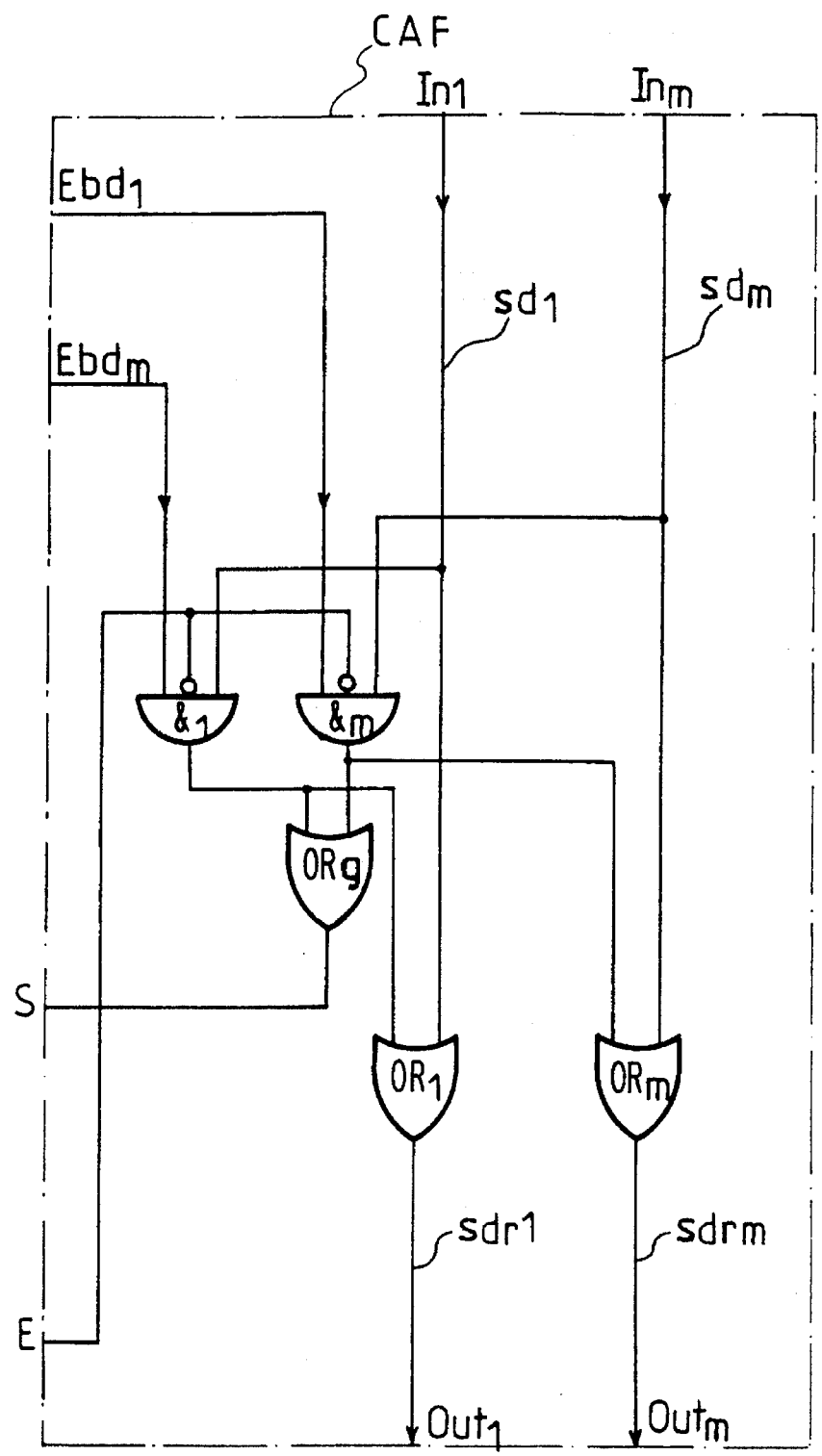
Figure 5:
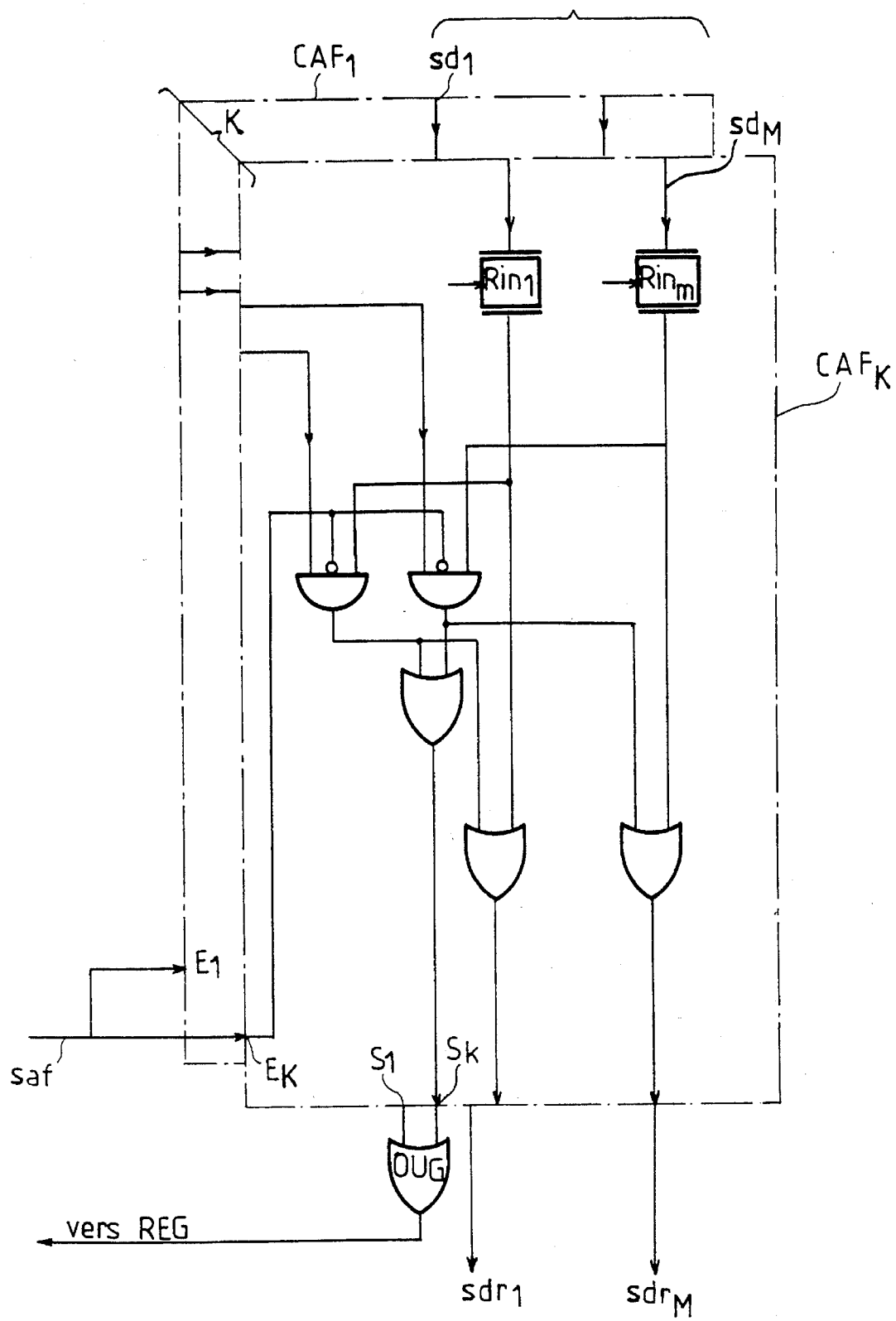

The above-mentioned characteristics of the invention, and others, can be more clearly understood by reading the following description of a sample application of the invention, to be read in conjunction with the enclosed diagrams, which are as follows:

FIG. 1 is a synoptic diagram of a switching network equipped with an input queueing system according to the invention, FIG. 2 is a synoptic diagram of an input circuit constituting one element of an input queueing system according to the invention, FIG. 3 is an operating diagram of an input circuit according to the invention, FIG. 4 is a synoptic diagram of an assignment circuit incorporated in an input circuit of a system according to the invention, and FIG. 5 is a synoptic diagram of a variant of the assignment circuit, allowing the capacity of a system according to the invention to be extended.

The switching network shown in FIG. 1 consists essentially of an input queueing management system comprising n input circuits $CE_1$ to $CE_n$, a time interval management unit UGIT, and a time base referred to as the system time base $Bt_s$. It also comprises a switching matrix MatCom.

Each input circuit $CE_i$ has an input $E_i$ for receiving cells of the type used in a data transmission and/or ATM system, consisting of a header section in which information relating to the system is stored, in particular the number of the virtual circuit to which the cell belongs, and a section containing the messages to be transmitted. Cells such as these are described in the patent document EP-A-108 028.

Each input circuit $CE_i$ also has an output $S_i$ which is connected to one of n inputs in the switching matrix MatCom.

The matrix is the non-blocking type, more particularly a non-blocking space-division switching matrix such as the "BATCHER BANYAN" type, or more generally any non-blocking space-division switching matrix other than those based on simultaneous, single-output access conflicts. The switching matrix MatCom does not necessarily contain n outputs and, later in this description, consideration will be given to a matrix containing m outputs.

Each input circuit $CE_i$ also has m inputs $Ea_1$ to $Ea_m$ in a one-to-one relation with the m outputs of the switching matrix MatCom, and m outputs $Sa_1$ to $Sa_m$ corresponding to the m inputs. Each output $Sa_j$ of an input circuit $CE_i$ is connected to the input $Ea_j$ of the next input circuit $CE_{i+1}$ in the succession of input circuits $CE_1$ to $CE_n$.

The time interval processing unit UGIT for the one part comprises m outputs $Sit_1$ to $Sit_m$, connected respectively to m inputs $Ea_1$ to $Ea_m$ of the first input circuit $CE_1$, and, for the other part, m inputs $Eit_1$ to $Eit_m$ connected respectively to m outputs $Sa_1$ to $Sa_m$ of the last input circuit $CE_n$.

The system time base $Bt_s$ for the one part sends a clock signal Sh, the duration of which is k times less than that of a time slot T, and, for the other part, a synchronization signal CSY equal in duration to p times the duration of a time slot, for example eight times the duration of a time slot T. The clock signal Sh and the synchronization signal CSY are sent to the first input circuit $CE_1$ and pass from one input circuit $CE_i$ to the next $CE_{i+1}$. They are sent from the last input circuit $CE_n$ to the UGIT processing unit.

The function of the UGIT unit is explained below.

A description now follows of an input circuit $CE_i$ in conjunction with FIG. 2 which shows a schematic representation.

The input circuit CE shown comprises a register RegAdMtr, a translation memory Mtrad, a cell memory MC, a delay circuit RET, a time base BT, an assignment circuit CAF, and a toggle Basc.

The Mtrad memory is a random access memory in which storage pockets are assigned to the virtual circuits that the system can process. When the system is initialized, a translated label $E_t$ is stored in each of these pockets, corresponding to the virtual circuit assigned to the pocket, which can also include a self-addressing label supplement. Also stored in each of the pockets associated with a virtual circuit are "outgoing direction" bits $Bd_1$ to $Bd_m$ equal in number m to the number of outputs in the switching matrix MatCom, which serve to specify, when positioned at one, the matrix output to which the cells carrying the number of the virtual circuit associated with the said pocket are addressed.

The bits $Bd_1$ to $Bd_m$ together form an outgoing direction signal whose structure may differ in other methods of application of the invention, for example binary coding of m outgoing directions. The latter solution would make it possible to reduce the amount of translation memory required to translate information relating to the outgoing direction, but would require the use of a decoder which could, for example, be incorporated in the CAF assignment circuit.

Wires showing the number of the virtual circuit VCI to which the cell present at input E belongs are connected to the input of the register RegAdMtr, the output of which is connected to the read address input of the translation memory Mtrad. In read mode, this sends the translated label $E_t$ which is then passed to the input of the memory MC, in addition to bits $Bd_1$ to $Bd_m$ which are sent to the corresponding inputs of the assignment circuit CAF.

Wires other than those showing the virtual circuit number are connected, via a delay circuit RET, to the input of the memory MC. The delay circuit RET is included to compensate for the time delays introduced by the memory Mtrad.

The memory MC has a number of pockets, each of which is intended to store all the bits of a particular cell.

The time base BT is controlled by the clock signal Sh received from the system time base Bts and is synchronized by the signal CSY sent by the preceding input circuit CE. Its function is to send a local time signal Hloc and a microinterval local time signal Mtl. Whereas one time unit of the local time signal Hloc corresponds to a time slot $T_o$ to $T_n$, the micro-interval time signal is subdivided into a time slot $T_j$, and into k time intervals taking the values Hloc+1 for the first, Hloc+2 for the second, and so on.

FIG. 3 shows three time slots $T_0$, $T_1$ and $T_2$, each subdivided into micro-intervals $t_0$ to $t_7$. This identification of times is valid for the first input circuit $CE_1$ and is offset by the duration of one micro-interval from one input circuit to the next, as shown by the thick stepped lines in FIG. 3.

It should be noted that k corresponds to the number of pulses of the clock signal Sh generated by the system time base $Bt_s$ during one time slot T. As can be seen below, the number k corresponds to the depth of a virtual input queue.

The time base BT of an input circuit $CE_i$ is designed such that its local time signal Hloc is one micro-interval behind the time base BT of the preceding input circuit $CE_{i-1}$. To do this, the time base BT of an input circuit $CE_i$ uses the synchronization signal CSY transmitted by the preceding input circuit $CE_{i-1}$ and transmits to the next circuit $CE_{i+1}$ a new synchronization signal CSY one micro-interval behind the old one.

In general, the value taken by the micro-interval time signal Mtl sent by the time base BT during the period $t_i$ of a time slot $T_j$ is the value of the time cell $T_{i+j+1}$. Thus, during the time slot $T_0$, the time interval signal takes the values $T_1$ at time $t_0$, $T_2$ at time $t_1$, etc. Similarly, during the time $T_1$, it takes the values $T_2$ at time $t_0$, $T_3$ at time $t_2$, etc.

Each pocket of the memory MC is read addressed by the local time signal Hloc received from the time base BT and is write addressed by the output signal sent by a register REG, the input of which receives the micro-interval time signal Mtl transmitted by the time base BT. The register REG has a control input which is connected to an output S of the assignment circuit CAF.

The assignment circuit CAF has m inputs $In_1$ to $In_m$ which receive, via the registers $Rin_1$ to $Rin_m$ (controlled respectively by the outgoing direction bits $Bd_1$ to $Bd_m$) the availability signals $sd_1$ to $Sd_m$ sent by the preceding input circuit, or, if the input circuit in question is the first in succession, by the time interval processing unit UGIT. It also has m outputs $Out_1$ to $Out_m$, which send the updated availability signals $sdr_1$ to $sdr_m$ to m inputs $Ea_1$ to $Ea_m$ of the next input circuit in succession or, if the input circuit in question is the last, to the corresponding inputs of the time interval processing unit UGIT. It has m inputs $Ebd_1$ to $Ebd_m$ which receive respectively the m outgoing direction bits $Bd_1$ to $Bd_m$ from the translation memory Mtrad. The output S of the circuit CAF is connected to the control input of the register REG. The circuit CAF has another input at which an assignment signal saf sent by the toggle Basc is present.

The toggle Basc has an input Es which is connected to the output S of the assignment circuit CAF and an output, for sending the assignment signal saf, connected to input E of the assignment circuit CAF. At its input Eh, it receives the signal Sh in such a way that it is synchronized with this signal and reset at the start of each time slot T. When a time slot, at time $t_i$, is assigned to the cell present at input E of the input circuit CE, the signal saf output by the toggle Basc changes to one and this level is maintained until the end of the time slot.

An input circuit CE according to the invention operates as follows.

When a cell arrives at the input E, it is stored with its header (translated and sent by the memory Mtrad) in a pocket of the memory MC at an address determined as follows.

At the same time as it delivers the translated header Et, the memory Mtrad sends the outgoing direction bits $Bd_1$ to $Bd_m$, one of which is at one, thus indicating the matrix output where the incoming cell will be output.

During the time slot in question, inputs $Ea_1$ to $Ea_m$ are scrutinized by the assignment circuit CAF during each time interval $t_0$ to $t_k$ of the current time slot.

Assuming that the cell currently being processed is addressed to the $j^{th}$ output of the switching matrix MatCom, the outgoing direction bit $Bd_j$ of row j will be at one.

If, during the time interval $t_i$, the $j^{th}$ input Eaj is at one, this means that the time slot $T_{a+i+1}$ is occupied at the $j^{th}$ output, a being the row of the time slot currently being processed.

However, if the $j^{th}$ input Eaj is at zero in the time interval $t_i$, this means that the time slot $T_{a+i+1}$ is free at the $j^{th}$ output of the switching matrix MatCom. At time $t_i$, the assignment circuit CAF therefore sends from its output S a signal controlling the register REG. The latter then sends to the write input of the memory MC the time interval signal Mtl received from the time base which is, as was shown earlier, equal to $T_{a+i+1}$. The cell is therefore stored at the address of the memory MC corresponding to $T_{a+i+1}$. The assignment circuit CAF also sends, from its output $Out_j$ in row j, the signal $sdr_j$ which is now at one, thus indicating occupation of the time slot $T_{a+i+1}$.

When the assignment circuit CAF controls the register REG, the input Es of the toggle Basc is at one. The output signal saf therefore also changes to one and remains so until the end of the current time slot. The assignment circuit CAF therefore no longer assigns a time slot to the current cell.

During the time slot in question $T_a$, the memory MC receives from the time base BT a read address signal Hloc equal in value to $T_a$. The cell stored at this address in the memory MC is therefore sent to the corresponding input of the switching matrix MatCom which can then process it.

The availability signals sd are transmitted, with a delay equal in duration to that of one micro-interval, from one input circuit to the next and from the last input circuit to the time interval management unit UGIT. The delay of one micro-interval is carried out by the registers $Rin_1$ to $Rin_m$ of each input circuit. This delay implies that local times sent by the time bases BT of the input circuits are, as discussed earlier, offset by the duration of one micro-interval.

FIG. 3 shows, by means of the arrows A, the exchange between the input circuits $CE_1$ to $CE_6$ of the words constituted by the concatenation of availability signals $sd_1$ to $sd_m$ during the first micro-interval $t_0$ and, by means of the arrows B, the exchange between the input circuits $CE_1$ to $CE_6$ of the words constituted by the concatenation of availability signals $sd_1$ to $sd_m$ during the second micro-interval $t_1$.

At the first micro interval $t_0$ of a time slot T, the time interval management unit UGIT is designed to send the availability signals $sd_1$ to $sd_m$ present at its inputs $Eit_1$ to $Eit_m$ during the last micro-interval of the preceding time slot, to the corresponding outputs $Sit_1$ to $Sit_m$. This function of the UGIT unit is represented in FIG. 3 by the arrows C.

It will be noted in FIG. 3 that the number of micro-intervals exceeds the number of input circuits by one. This makes it possible to create an offset of one micro-interval, such that the word present during the first time interval of the next time slot always indicates a free condition.

FIG. 4 shows a logic diagram of an assignment circuit CAF. It comprises m AND gates $AND_1$ to $AND_m$ with three inputs. The first input of gate $AND_j$ in row j is connected to the input $Ebd_j$ receiving the outgoing direction bit $Bd_j$ of row j, a second input receiving the availability bit $sd_j$ of row j, and a third inverter input connected to input E which is normally connected to the output of the toggle Basc. The outputs of gates $AND_1$ and $AND_m$ are connected respectively to the inputs of an OR gate $OR_g$, the output of which constitutes the output S of the assignment circuit CAF.

The output of the gate $AND_j$ of row j is also connected to the first input of an OR gate $OR_j$, the second input of which receives the availability signal $Sd_j$ of row j. The outputs of gates $OR_1$ to $OR_m$ are connected respectively to the outputs $Out_1$ to $Out_m$.

Let us assume that no time slot has yet been assigned to the incoming cell, such that the input E is at zero.

Let us assume that the cell currently being processed is addressed to the $j^{th}$ output of the switching matrix MatCom. The outgoing direction bit $Bd_j$ of row j at the input $Ebd_j$ is therefore at one, whereas the the other bits are at zero.

If the $j^{th}$ availability signal $sd_j$ is at one, the gate $AND_j$ of row j sends a one, whereas the other gates send a zero.

The gate ORg then sends a one, which has the effect of controlling the register REG and changing the signal saf to one at the output of the toggle Basc, and therefore at the input E, until the end of the time slot. As a result, throughout this period, the outputs of all of the gates $AND_1$ to $AND_m$ are at zero.

It can be seen that the toggle Basc therefore prevents a single cell from being assigned to several different time slots, and, as a consequence, from being stored in several different addresses in the memory MC.

If, contrary to the above, the $j^{th}$ availability signal $sd_j$ is at zero, the gate $AND_j$ of row j sends a zero and, as all the other gates $AND_1$ to $AND_m$ also send a zero, the gate $OR_g$ sends a zero. The cell is therefore not stored at the address corresponding to the micro-interval during which the above process takes place.

It will be noted that in order to limit the number of pockets required by the memory MC, an indirect address memory may be used to save the storage address in the memory MC of the incoming cell, which address is determined by an available address determination device. Details of a memory MC, indirect available address memory, and available address determination device such as this are described fully in the patent FR-A-2 617 302 and are in all respects equivalent in operation, within the framework of the present invention, to the memory MC described herein.

It will be noted that the assignment circuit may be comprised of several elementary circuits such as that shown in FIG. 4, including the registers $Rin_1$ to $Rin_m$. The figure shows an assignment circuit such as this containing K elementary assignment circuits $CAF_1$ to $CAF_K$ and their interconnection to an input circuit CE.

The inputs $E_1$ to $E_K$ of all the assignment circuits $CAF_1$ to $CAF_K$ are connected in parallel to receive the assignment signal saf from the toggle Basc of the input circuit CE in question. An OR gate $OR_G$ has K inputs connected respectively to the outputs S of the basic assignment circuits, and an output connected to the control input of the register REG of the input circuit in question.

The availability signals $sd_1$ to $sd_M$, where M=K×m, are distributed over each of the basic circuits $CAF_1$ to $CAF_K$, and the latter send the updated availability signals $sdr_1$ to $sdr_M$, in number K×m.

We claim:

1. Input queueing system for connection to n inputs of a switching matrix (MatCom) having m outputs; said queueing system comprising a succession of G input circuits ($CE_1$ to $CE_n$) each of which is associated with an input circuit identifying time slot, the input circuits having respective inputs which ($E_1$ to $E_n$) receive a type of data cells used in a data transmission system; and the input circuits having outputs ($S_1$ to $S_n$) connected respectively to corresponding inputs of the switching matrix (MatCom), each input circuit ($CE_1$ to $CE_n$) containing m additional inputs ($Ea_1$ to $Ea_m$) in a one-to-one relation with the outputs of the switching matrix (MatCom); each input ($Ea_1$ to $Ea_m$) of each input circuit receiving, during an identified time slot, a series of availability signals ($sd_1$ to $sd_m$) assigned to respective time slots which are later than the input circuit identifying time slot; each availability signal ($sd_j$) indicating an availability condition at the matrix output that corresponds to the input circuit ($Ea_j$) for the emission of a cell into the time slot assigned to that signal; each input circuit ($CE_i$) having a memory for storing a cell that is present at its input ($E_i$) at an address identifying a time slot assigned to an availability signal ($sd_1$ to $sd_m$) indicating an available condition for an emission of the cell at the output of the matrix (MatCom) to which the cell is addressed; the availability signal (sd) indicating, after the storing operation, a non-available condition; and reading the memory (MC) at an address corresponding to the time slot identifying the cell stored at this address for sending said cell to the switching matrix (MatCom).

2. A system according to claim 1, wherein said availability signals ($sd_1$ to $sd_m$) carried by each input ($Ea_1$ to $Ea_m$) of each input circuit ($CE_1$ to $CE_n$ during one time slot are present respectively at said input during micro-intervals ($t_o$ to $t_k$) that subdivide each time slot, and said respective time slots later than the input circuit identifying time slot are individually assigned to said micro-intervals.

3. A system according to claim 2, wherein the micro intervals ($t_o$ to $t_k$) are determined by signals (Mtl) sent by a time base (BT) clock, the storage address of the cell present at the input ($E_i$) of the input circuit ($CE_i$) being determined from the value taken by the micro-interval time signals (Mtl) when the availability signal ($sd_j$) at the input ($Ea_j$) corresponding to the switching matrix output to which the current cell is addressed indicates an available condition.

4. A system according to claim 3, wherein the system comprises means for reading the memory (MC) in response to a local time signal (Hloc) sent by the time base (BT) clock, and for writing the address of the micro-interval time signals (Mtl) sent by the time base (BT) clock.

5. A system according to any one of the claims 1–4, wherein the system comprises means (Basc) for preventing a cell that has already been stored from being stored again.

6. A system according to any one of the claims 1–4, wherein each of said input circuits ($CE_1$ to $CE_n$) has m outputs ($Sa_1$ to $Sa_m$) corresponding to m inputs ($Ea_1$ to $Ea_m$) which receive updated availability signals ($sdr_1$ to $sdr_m$), the m outputs ($Sa_1$ to $Sa_m$) of each input circuit ($CE_i$) being connected to m inputs ($Ea_1$ to $Ea_m$) of a next in a succession of the input circuits ($CE_{i+1}$).

7. A system according to claim 6, wherein the system comprises delay means for sending the updated availability signals ($sdr_1$ to $sdr_m$) to the m outputs ($Sa_1$ to $Sa_m$) of one of the input circuits ($CE_i$) and then to the m inputs ($Ea_1$ to $Ea_m$) of the next input circuit ($CE_{i+1}$) in the succession of input circuits with a delay equal in duration to a time period of one of said micro-intervals, the time base (BT) clock of an input circuit ($CE_i$) being offset by the duration of one micro-interval, the delay being transferred from one input circuit to the next input circuit in said succession.

8. A system according to claim 6, wherein each input circuit ($CE_i$) contains an assignment circuit (CAF) for scrutinizing the availability signals ($sd_1$ to $sd_m$) which are present at the m inputs ($Ea_1$ to $Ea_m$) of the input circuits (CE), and the assignment circuit delivering updated availability signals ($sdr_1$ to $sdr_m$) to the m outputs ($Sa_1$ to $Sa_m$) of this input circuit, and a control signal to an output (S) which, when active, controls the storage in the memory (MC) of the cell present at the input ($E_i$) of the input circuit ($CE_i$).

9. A system according to claim 8 wherein the assignment circuit (CAF) comprises m AND gates ($AND_1$ to $AND_m$) each having at least two inputs, a first of said at least two inputs receiving outgoing direction signals ($Bd_1$ to $Bd_m$), a second of said at least two inputs receiving the availability signals ($sd_1$ to $sd_m$), the outputs of said AND gates ($AND_1$ and $AND_m$) being connected respectively to the inputs of a first OR gate ($OR_g$), the output of said first OR gate constituting the output (S) of the assignment circuit (CAF), the output of each AND gate ($ET_j$) of a row j being also connected to one input of an OR gate ($OR_j$), a second input of said OR gate receiving the availability signal ($sd_j$) of row j, outputs of the gates ($OR_1$ to $OR_m$) being connected respectively to outputs ($Out_1$ to $Out_m$) of the assignment circuit (CAF) for sending the updated availability signals ($sdr_1$ to $sdr_m$).

10. A system according to claim 6, wherein the assignment circuit (CAF) comprises inputs ($Ebd_1$ to $Ebd_m$) which are coupled to receive outgoing direction signals ($Bd_1$ to $Bd_m$) indicating the output of the switching matrix (MatCom) to which the cell currently present at the input ($E_i$) of the input circuit ($CE_i$) is addressed.

* * * * *